United States Patent [19]
Schatz

[11] Patent Number: 5,199,484
[45] Date of Patent: Apr. 6, 1993

[54] HEAT STORAGE MEANS, MORE ESPECIALLY A LATENT HEAT STORAGE MEANS FOR MOTOR VEHICLE HEATING MEANS SUPPLIED WITH WASTE HEAT FROM THE ENGINE

[76] Inventor: Oskar Schatz, Waldpromenade 16, D8035 Gauting, Fed. Rep. of Germany

[21] Appl. No.: 628,457

[22] Filed: Mar. 13, 1991

Related U.S. Application Data

[63] Continuation of Ser. No. 224,820, Jul. 27, 1988, Pat. No. 4,977,952.

[30] Foreign Application Priority Data

Jul. 29, 1987 [DE] Fed. Rep. of Germany ....... 3725163

[51] Int. Cl.⁵ .............................................. F28D 20/00
[52] U.S. Cl. ........................................ 165/10; 165/41; 165/135; 220/423; 220/445
[58] Field of Search ........................... 165/10, 135, 41; 220/445, 421, 423, 424, 426; 123/41.14

[56] References Cited

U.S. PATENT DOCUMENTS

| | | |
|---|---|---|
| 1,962,932 | 6/1934 | Mather, Jr. ............... 123/41.14 |
| 2,702,458 | 2/1955 | Del Mar ..................... 220/423 |
| 3,289,423 | 12/1966 | Berner et al. .............. 220/445 |
| 4,415,118 | 11/1983 | Endo ........................... 165/10 |
| 4,496,073 | 1/1985 | Silver et al. . |
| 4,977,952 | 12/1990 | Schatz ......................... 165/10 |

FOREIGN PATENT DOCUMENTS

3245027 6/1984 Fed. Rep. of Germany .
164516 12/1980 Japan ........................... 165/10

Primary Examiner—Albert W. Davis, Jr.
Attorney, Agent, or Firm—Harness, Dickey & Pierce

[57] ABSTRACT

In the case of a heat storage means, more especially a latent heat storage means (10) for motor vehicle heating systems run on waste engine heat there is a load bearing insulation (26 28) between an inner housing (14) enclosing a storage core (16) and an outer housing (12) surrounding the inner housing with a clearance, such insulation being divided up into separate support members, which are preferably divided in support zones separated by intermediate spaces from each other.

3 Claims, 1 Drawing Sheet

HEAT STORAGE MEANS, MORE ESPECIALLY A LATENT HEAT STORAGE MEANS FOR MOTOR VEHICLE HEATING MEANS SUPPLIED WITH WASTE HEAT FROM THE ENGINE

This is a continuation of U.S. patent application Ser. No. 224,820, filed Jul. 27, 1988, now U.S. Pat. No. 4,977,952, entitled HEAT STORAGE MEANS, MORE ESPECIALLY A HEAT STORAGE MEANS FOR MOTOR VEHICLE HEATING MEANS SUPPLIED WITH WASTE HEAT FROM THE ENGINE.

The invention relates to a heat storage means, more especially a latent heat storage means for motor vehicle heating means supplied with engine waste heat, comprising an inner housing surrounding a storage core, an outer housing surrounding the inner housing with a clearance and an evacuated load bearing thermal insulation means between the inner housing and the outer housing.

It is a known practice to evacuate the space between an inner and outer housing as a vacuum space so that if the space is in the form of a narrow gap there is a powerful insulating effect. In this respect it is also a known practice to fill such a gap prior to evacuation with a microporous material, which serves to support the outer housing on the inner housing and thus to take up the force due to the vacuum so that the outer housing may be made with a comparatively thin wall in order to reduce weight and costs.

In order to create a highly efficient insulation it is convenient to produce a high vacuum in the vacuum gap. In order to maintain such a high vacuum over a long period of time it is necessary to degas the surface layers next to the vacuum gap of the inner and outer housings. Both the evacuation and the degassing operation as well are hindered by the high resistance to flow of the load bearing insulation of microporous materials.

The highly efficient insulation strived for by having a high vacuum is impaired to a certain extent by the solid state conduction, caused by the load bearing insulation, between the inner and the outer housings.

One object of the present invention is to design a heat storage means of the initially mentioned type such that it ensures a highly efficient thermal insulating effect which is maintained over a long period of time while at the same time having the lowest possible weight and the lowest possible costs.

In order to achieve this object in the invention the load bearing thermal insulation is divided up among mutually separated support members.

As a result flow paths are created for the gases to be removed in the vacuum gap so that the degassing and evacuation and thus the production of a permanent high vacuum is substantially facilitated.

In accordance with one advantageous form of the invention the load bearing thermal insulation is distributed among separate support zones separated from each other by intermediate spaces so that solid state thermal conduction is reduced.

As is to be seen from the use of such heat storage means for example in motor vehicle heating systems, there are fields of application, in which care has to be taken to see that the heat storage means has the very lowest possible weight. A factor influencing the overall weight to a substantial degree in such heat storage means is the insulation between the inner and the outer housings and the weight of such housings. Owing to such a load bearing insulation there is the possibility of making the outer housing so as to be less strong so that the weight is reduced. Furthermore this leads to a greater degree of freedom as regards the selection of the respectively suitable form of housing. The load bearing insulation material is however comparatively heavy so that its use is antagonistic to the aim of reducing weight. Owing to the division up of the load bearing insulation among a number of support zones separated from each other by intermediate spaces the weight of the load bearing insulation is reduced. Although the effect of the vacuum present between the inner and the outer housings causes the housing walls and more especially that of the outer housing to deform, such deformation does not impair the function of the heat storage means and may be tolerated.

In accordance with a further convenient development of the invention it is possible to have radiation shields in the intermediate spaces so that there is a still further reduction in heat losses. It is possible to have groups of radiation shields in each intermediate space, the thermal losses then being able to be further reduced if the radiation shields are sufficiently close together.

In accordance with a further convenient form of the invention there is a light non-load bearing insulation material in the intermediate spaces so that without any significant effect on the overall weight the insulation effect is further improved.

In accordance with a particularly advantageous form of the invention the thermal insulation subdivides each zone into an inner section supported on the inner housing and an outer section supported on the outer housing and the inner and the outer sections are so offset in relation to each other that their cross-sections as seen in the direction of support have a space between them and between the free ends of the inner section and of the outer section a preloaded tie is secured. This means that there is a further reduction in solid state thermal conduction, since the load bearing insulation does not maintain any direct connection between the inner and the outer housings. In accordance with a particularly convenient development of the invention the tie is made of a material with a low thermal conductivity. For instance, the tie may be a foil subdividing the space between the inner and the outer housing into an inner zone and an outer one.

The supporting members may consist of an at least generally dimensionally stable insulation material, as for instance more especially fiber glass material. However there is also the further possibility, in view of the relatively high weight of this dimensionally stable material, of using a non-dimensionally stable insulation material on account of the lower weight, such material being surrounded by walls and thus collected together in load bearing unit. In accordance with an advantageous form of the invention the support members are in the form of cushion-like elements resting on the inner and outer housings in a sheet-like manner and which are deformable and in the case of which a thin-walled, readily bent, substantially stress-free wall encloses a filling of insulation material, which consists of particles with a low coefficient of fraction on each other. In this respect the filling may consist of a pourable insulation material or of a gas with a low thermal conductivity.

Preferably the wall also consists of a material with a low thermal conductivity.

When using a pourable filling the wall may preferably be permeable to gas. The wall can for instance be in the form of a wire fabric or of a porous membrane. As a filling it is preferred to use a microporous insulating material.

The use of support members in the form of these cushion-like elements makes it possible to incorporate even light, pourable insulation material in a simple manner in the intermediate space between the inner housing and the outer one at to locate it at all positions at which a supporting effect is desired. In this case the insulation material is prevented from penetrating into parts in which it is not desired. Furthermore the material may settle without this causing a loss of the supporting and insulating effect after longer periods of use and without undesired compaction or dilution of the material taking place after long periods of use.

Despite the use of a pourable material the zones provided with the insulation material may be limited to selected support zones so that the use of insulation material may be limited in amount as is needed for the desired support action, this on the other hand facilitating drainage during evacuation and degassing.

The sheet-like engagement of the cushion-like support members on the inner and the outer housing is necessary for reliable support thereof and is achieved by a suitable selection of the degree of filling of the cushion wall prior to fitting. It is convenient if the support members are placed with a preloading effect during assembly in the intermediate space between the inner and the outer housings that is to say the are pressed in place in order to ensure that they are firmly located.

The shape of the support members may be in accordance with the form of the housing of the heat storage means, the term cushion-like in relation to the support members not meaning the shape but the deformability of the support members. The cushion-like elements may have the form of more or less flattened balls, but they may have the form of sausages and then be aligned in linear manner or in spirals or in rings and for instance also be arranged in the form of concentric rings.

On the basis the following description an account in more detail will now be given of the invention with reference to the working examples shown in the drawing FIG. 1 is a perspective external view of a heat storage means constructed in accordance with the invention prior to the production of the vacuum between the inner and the outer housings.

Figure 1:
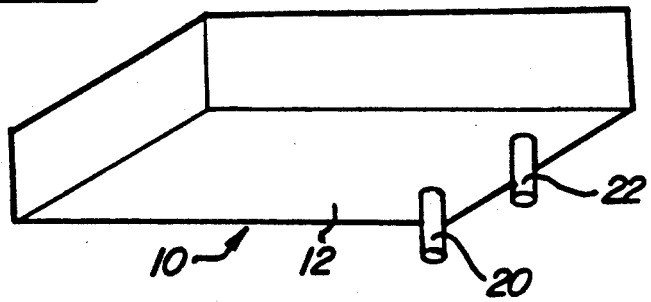

A latent heat storage means generally referenced 10 consists of an outer housing 12, which surrounds an inner housing 14 on all sides thereof. The heat storing storage core is arranged in the inner housing 14. The design of such a storage core is known to those in the art, see for instance the German unexamined specification 3,245,027, for which reason it is not explained here in detail and is only generally referenced 16.

For the supply and removal of the heat transporting vehicle, which in the present case is the cooling water of an IC engine, there is a supply duct 20 and a drain duct 22, which open into the inner housing 14 and which are led off to the outside through the intermediate space 18, accommodating the thermal insulation, between the inner and the outer housing and out of the outer housing 12 to the outside.

Figure 2:
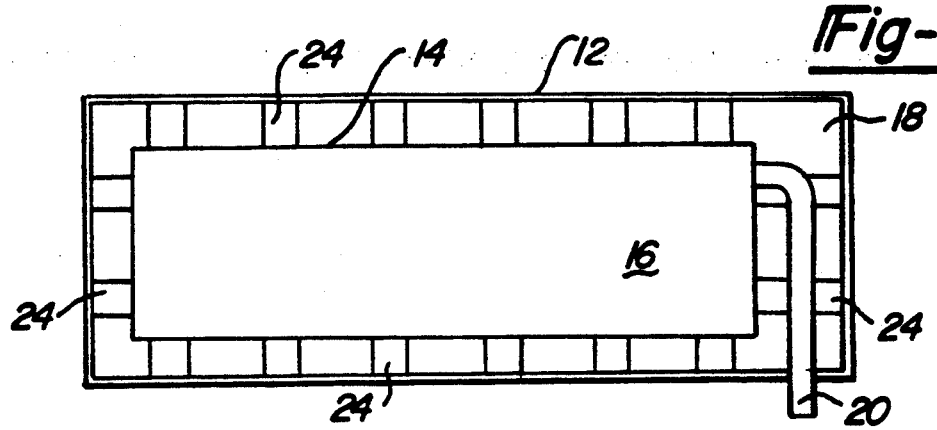
FIG. 2 is a section through the heat storage means shown in FIG. 1 omitting the storage core present in the inner housing.
Figure 3:
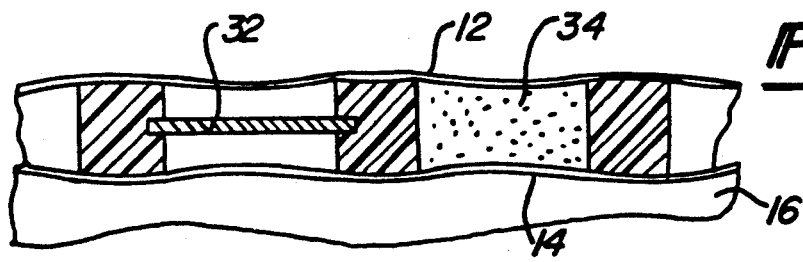
FIG. 3 is a detailed section taken through the wall part between the inner and the outer housings.
Figure 4:
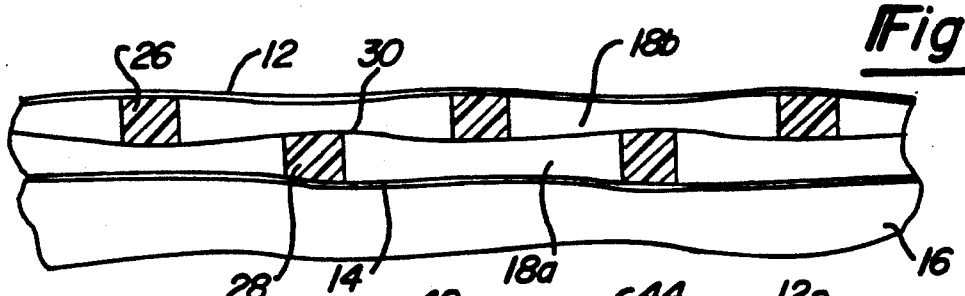
FIG. 4 is a section corresponding to figure 3 to show another embodiment of the invention.

In order to support the outer housing 12 on the inner housing 14, there are spaced support elements 24 (FIGS. 2 and 3), which consist of a load bearing material such as more particularly fiber glass. The result is then the creation of support zones separated from each other by intermediate spaces, which maintain the clearance needed for thermal insulation between the outer housing 12 and the inner housing 14, the creation of an insulating vacuum between the two housings 12 and 14 deforming the housing sections between the support zones and between the two housings 12 and 14 towards the respectively opposite wall of the other housing, as is indicated in FIGS. 3 and 4. This deformation however does not impair the function of the heat storage means and the insulation zone and may thus be tolerated in view of the reduction in weight made possible thereby.

In the case of the working example shown in FIG. 3 ribs 24 of load bearing insulation material are arranged in the support zones, which span the full distance between the outer housing 12 and the inner housing 14. In the intermediate spaces between the ribs 24 it is possible for radiation shields 32 to be provided, but it is also possible to have non-load bearing insulation material 34 with a comparatively low weight in this zone.

FIG. 4 shows a particularly advantageous form of the invention in which ribs 26 are arranged on the inner side of the outer housing 12 while on the outer side of the inner housing 14 ribs 28 are arranged, which each consist of a load bearing insulation material and whose height is less than the distance between the outer housing 12 and the inner housing 14. Furthermore the ribs 26 and 28 are in each case offset by half the spacing between the ribs 26 and 28. Between the outer housing 12 and the inner housing 14 there is a foil 30, which is placed between the outer housing 12 and the inner one 14, such foil 30 being held between the ribs 26 and 28. It rests against the end surface turned away from the respective housing 12 and 14, respectively so that the foil forms a tie, which maintains the space between the outer housing 12 and the inner housing 14 and subdivides the intermediate space 18 into an inner zone 18a and an outer zone 18b.

Preferably the foil 30 is made of a material with a low thermal conductivity. Owing to the offset arrangement of the ribs 26 and 28 the possibility of the conduction of heat between the outer housing 12 and the inner housing 14 is further reduced so that in this form of the invention in addition to the low weight of the heat storage means there is a particularly satisfactory insulation effect.

Figure 5:
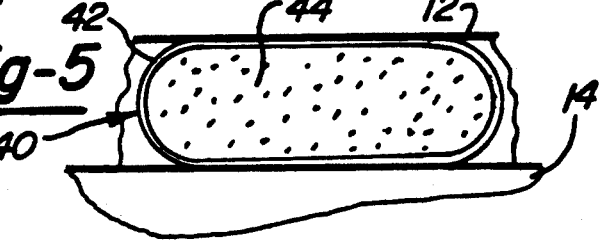
FIG. 5 is a detailed section taken through a fitted cushion-like support member, which is filled with pourable insulation material.

FIG. 5 shows a cushion-like support member 40 with a wall 42 in the form of a porous membrane and which prior to placement between the outer housing 12 and the inner housing 14 of the heat storage means 10 is so filled with a filling 44 of pourable microporous insulation material and then sealed that in the final position as shown in FIG. 5 the supporting member makes a sheet-like contact with the outer housing 12 and the inner housing 14 with a preloading effect, that is to say, the bearing pressure exerted by the outer housing 12 and the inner housing 14 on the member the surface pressure so produced on the filling material 44 causes there to be a sort of static pressure in the support member 40.

I claim:

1. A latent heat storage means supplied with engine waste heat, comprising an inner housing surrounding a storage core, an outer housing surrounding the inner housing with a clearance and a load bearing thermal insulation means between the inner housing and the outer housing characterized in that the load bearing thermal insulation means includes a plurality of insulating support members positioned between said inner and outer housing, said plurality of insulating support members formed from a cushioning deformable member, one or more spaces formed in said bearing insulation means, such that said plurality of insulating support members are mutually separate from one another so that flow paths are created to produce a vacuum and one or more radiation shields positioned in said one or more spaces.

2. The heat storage means of claim 1, wherein at least one of said spaces includes a non-load bearing insulating material.

3. The heat storage means of claim 1, wherein the support members consist of a porous membrane material.